United States Patent [19]

Kreikle et al.

[11] Patent Number: 4,864,900

[45] Date of Patent: Sep. 12, 1989

[54] TESTING AND ADJUSTING TOOL FOR AIR BRAKE CAMS

[76] Inventors: Laurent Kreikle, 2552 Francis Street, Regina, Saskatchewan, Canada, S4N 2R2; Alfred A. Eason, 7228-6th Avenue, Regina, Saskatchewan, Canada, S4T 0P2

[21] Appl. No.: 230,037

[22] Filed: Aug. 9, 1988

[30] Foreign Application Priority Data

Aug. 18, 1987 [CH] Switzerland ............................ 544753

[51] Int. Cl.⁴ ............................................. B25B 13/02
[52] U.S. Cl. ......................................... 81/119; 7/100; 81/125.1
[58] Field of Search .................... 7/100; 81/119, 125.1, 81/176.1, 176.15, 177.1, 177.2, 487–489

[56] References Cited

U.S. PATENT DOCUMENTS

| | | | |
|---|---|---|---|
| D. 53,613 | 7/1919 | Rockwell | 81/119 X |
| 466,912 | 1/1892 | Schofield | 81/176.2 X |
| 1,366,923 | 2/1921 | Newton | 81/176.2 X |
| 2,490,739 | 12/1949 | Nesbitt | 81/177.2 |
| 4,597,123 | 7/1986 | Cobe | 81/176.1 X |
| 4,625,353 | 12/1986 | Tamez et al. | 7/100 |
| 4,685,164 | 8/1987 | Sebalos | 7/100 X |

*Primary Examiner*—James G. Smith
*Attorney, Agent, or Firm*—Stanley G. Ade; Adrain D. Battison; Murray E. Thrift

[57] ABSTRACT

Conventionally, air brake cam clearance is difficult to check due to inaccessibility and the force necessary to rotate the cam to check for the required clearance. The present device engages around the end of the cam lever both front and back and gives sufficient leverage to rotate the cam without any danger of slippage occurring. A wrench is formed on the opposite end of the tool and may be used for adjusting the clearance if necessary.

12 Claims, 1 Drawing Sheet

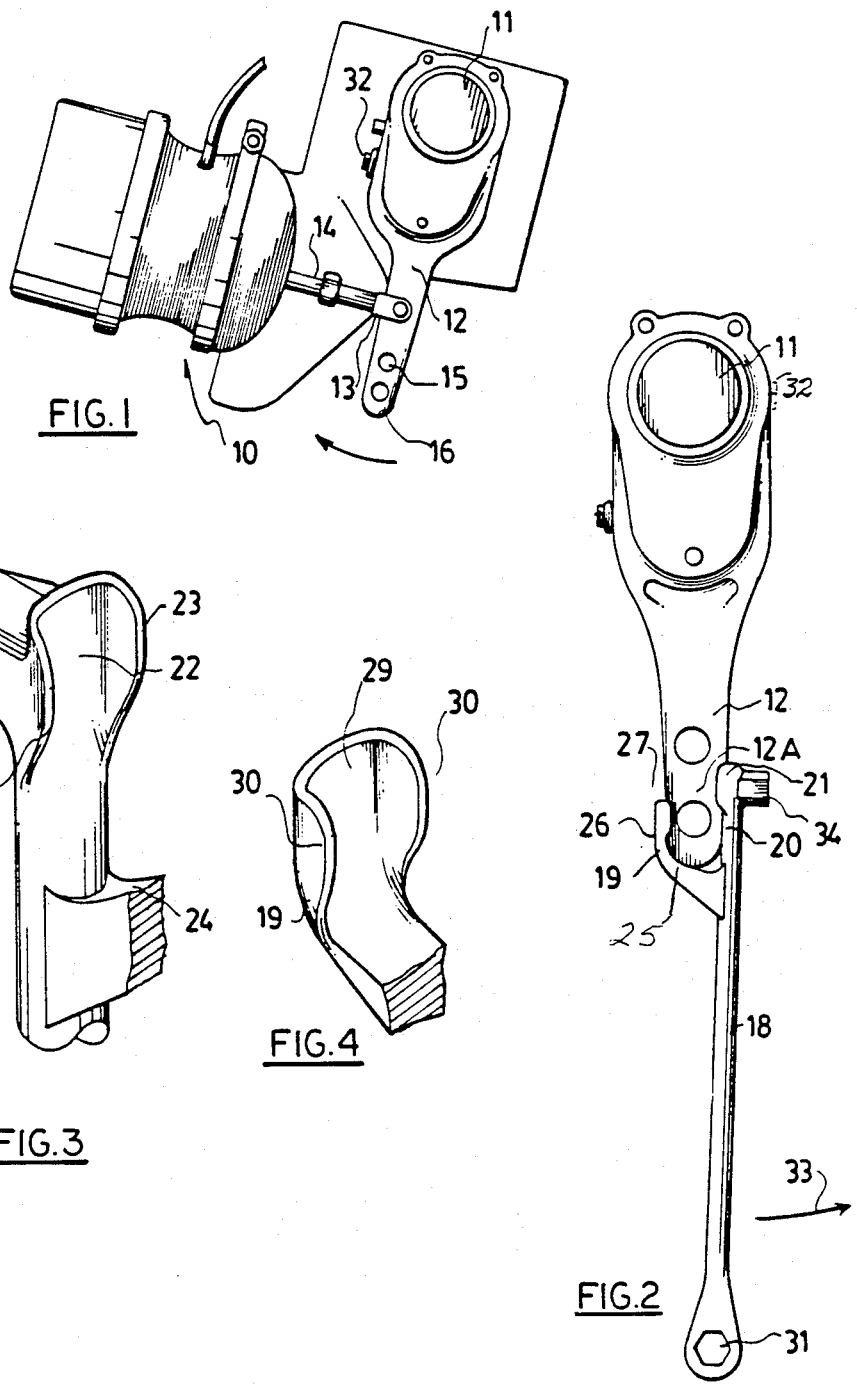

TESTING AND ADJUSTING TOOL FOR AIR BRAKE CAMS

BACKGROUND OF THE INVENTION

This invention relates to new and useful improvements in tools for testing and adjusting the cams of air brakes on heavy duty vehicles.

It is essential that sufficient clearance be provided and maintained between the cam lever and the actuating valve of the cam in order to prevent the brakes from binding when in the "off" position.

For example it is necessary to maintain approximately 1½ inches of clearance or movement of the end of the cam lever where same is connected with the actuating rods, in order to ensure the necessary clearance. If more than 1½ inches is provided, then fill power may not be applied to the brakes and, as mentioned previously, if no clearance is provided there is the danger of the brakes binding even although they are not being actuated.

Due to the inaccessibility of such cam levers and the difficulty of rotating same in order to check the clearance, it is normal to use a short rod such as a centre punch engaged within one of the clevis attaching holes in the end of the lever and attempt to move the lever in an arc in order to test for the clearance. Such a device often slips, because of the pressure required, causing injury to the knuckles of the operator so that it is common practice to tighten the cam up as far as possible and then back off the adjusting nut approximately one-half a turn. This of course is not an accurate way to set clearance and the danger always exists that such brakes will bind even though they are not being used.

PRIOR ART

U.S. Pat. No. 1,291,633, Jan. 14, 1919, J. G. Allmon. This patent discloses a wrench having a jaw designed to engage the periphery of a disc and a pin to engage an aperture in the surface of the disc.

U.S. Pat. No. 3,230,783, Jan. 25, 1966, A. F. Anderson. This shows an accurate jaw on the end of a handle with a projection on the distal end of the jaw. The jaw is adapted to engage the periphery of a wheel on a shaft with the projection engaging indentations in the wheel so that the wheel and shaft can be turned.

U.S. Pat. No. 3,367,218, Feb. 6, 1968, E. J. Koubele. This discloses a wrench specifically designed to turn flanged couplings by engaging an aperture at one end of a accurately curved jaw with a pin projecting from the coupling.

U.S. Pat. No. 3,757,614, Sept. 11, 1973, Evans et al. This shows an open ended parallel jawed wrench for turning hexagonal nuts.

U.S. Pat. No. 3,881,377, May 6, 1975, Evans et al. This also shows an open ended ratcheting wrench for octagonal nuts or bolts.

U.S. Pat. No. 4,181,048, Jan. 1, 1980, Ralph L. Norton. This shows a flange turning tool having a handle with a pin extending therefrom engageable within an aperture in the form of the flange and including a thrust flange to engage the shoulder defined by the rear enlarged portion of the head member.

The present invention overcomes these disadvantages by providing a clearance testing and adjusting tool for air brake cams which includes an actuating lever having a front side and a rear side; said tool comprising an elongated handle and a front and rear jaw extending from one end thereof, said jaws lying on the same plane, said front jaw having a recess on the inner surface thereof to engage over the front side of the actuating lever, said rear jaw also having a recess engaging over the rear side of the actuating lever whereby said lever may be rocked in an arc to test the clearances existing in said air brake cam, one of said jaws being located in a transverse plane above the other of said jaws.

Another advantage of the invention is that a wrench may be formed on the opposite end of the adjusting tool handle enabling the cam adjusting nut to be adjusted if necessary so that alternate adjusting and testing can take place until the requisite clearance is obtained.

Another advantage of the invention is that a small hammer may be incorporated in one of the jaws which enables rust, scale and the like to be removed from adjacent the adjusting nut prior to engaging a wrench thereover.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a fragmentary side elevation of an air brake assembly showing the adjusting cam lever.

FIG. 2 is an enlarged view of the lever with the invention engaged thereon.

FIG. 3 is an enlarged fragmentary perspective view of the front jaw of the invention relative to FIG. 2.

FIG. 4 is an enlarged fragmentary isometric view of the rear jaw of the invention relative to FIG. 2.

In the drawings like characters of reference indicate corresponding parts in the different figures.

DETAILED DESCRIPTION

Proceeding therefore to describe the invention in detail, reference character 10 illustrates generally, an air brake assembly including the actuating shaft 11 and the actuating lever 12 secured to the shaft. A clevis 13 connected to an actuating rod assembly 14, may be pivotally secured to any one of a plurality of apertures 15 formed adjacent the distal end 16 of the lever 12 for actuating the air brakes in a conventional manner.

The invention collectively designated 17 includes an elongated handle 18 having a rear jaw 19 formed on one end thereof together with a front jaw 20 (both relative to FIG. 2) in spaced apart relationship and in the same plane one with the other.

It will be noted that the jaw 20 is longer than the jaw 19 to assist in engaging same around the lever 12 and to give sufficient leverage to enable the cam lever 12 to be rocked fore and after when testing the clearance thereof.

The front jaw 20 is an extension of one side of the handle 16 and terminates in a distal end 21 in the form of a recess or pocket 22 and defined by a base and a pair of slightly diverging side flanges 23 terminating at an inner end 24 where they merge with the handle 16. Thus forming a substantially semi-cylindrical pocket.

The rear jaw 19 is off-standing from the handle 18 and inclines outwardly as at 25 and then curves upwardly as at 26, substantially parallel to the distal end 21 of the front jaw but terminates spaced therefrom as clearly shown. The distal end 27 of the rear jaw is also in the form of a recess or pocket 29 which is defined by a base and the two spaced slightly diverging side flanges 30 as shown in FIG. 4 which form the substantially semi-cylindrical recess or pocket 29 therebetween.

It will be noted that a wrench socket 31 is formed on the other end of the handle 18 engageable over the valve adjusting nut 32 of the cam assembly, said adjusting nut adjusting the rotational clearance of the cam lever relative to the actuating assembly (not illustrated).

In operation, the jaws are engaged snugly over the lower end portion 12A of the lever 12 with the front jaw engaging the front side of the lever 12 and the rear jaw engaging the rear side of lever 12 with the curved portion 25 nesting around the curvature of the lower end of lever 12. The handle 18 is substantially in alignment with the rear side of the lever and forms an extension thereof thus giving increased leverage and enabling the lever to be rotated from the rest position rearwardly in the direction of arrow 33 and then rocked fore and aft so that the clearance present can be ascertained. It should be understood that the actuating clevis 13 is disconnected for this operation and the 1½ inch clearance desired is at the location of the clevis 13 upon the lever 12.

If the correct clearance is not present, the wrench 31 can be engaged over nut 32 which can be adjusted and then retesting can take place until the correct clearance is obtained whereupon the clevis 13 may be reconnected with the lever 12.

It will also be noted that a small hammerhead 34 is provided on the rear of the front jaw 20 and this can be used to chip away any rust or scale which may exist around the adjusting nut prior to the testing and adjustment taking place.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A clearance testing and adjusting tool for air brake cams which includes an actuating lever having a front side and a rear side; said tool comprising an elongated handle and a front and rear jaw extending from one end therof, said jaws lying on the same plane and each including a transverse axis, said front jaw having a recess on the inner surface thereof to engage over the front side of the actuating lever, said rear jaw also having a recess engaging over the rear side of the actuating lever whereby said lever may be rocked in an arc to test the clearances existing in said air brake cam, the transverse axis of one of said jaws being located above the transverse axis of the other of said jaw, said front jaw being in substantial alignment with said elongated handle with the distal end thereof facing toward said rear jaw, said rear jaw being offset from said handle and curving outwardly and then upwardly substantially parallel to said front jaw but terminating spaced apart therefrom, said front jaw being in the form of a substantially U-shaped cross-sectional pocket having a base formed by one of the sides of the said handle and a pair of substantially spaced and slightly diverging side flanges extending from said handle one upon each side of said one side of said handle substantially perpendicular to the plane of said one side, said flanges engaging one upon each side of said lever when engaged upon said actuating lever.

2. The tool according to claim 1 in which said front jaw is longer than said rear jaw, thereby locating same in a plane above said rear jaw.

3. The tool according to claim 1 in which said cam includes a clearance adjusting nut thereon, a wrench socket formed on the other end of said handle operatively engageable with said nut to rotate same and hence adjust the clearance of said cam.

4. The tool according to claim 2 in which said cam includes a clearance adjusting nut thereon, a wrench socket formed on the other end of said handle operatively engageable with said nut to rotate same and hence adjust the clearance of said cam.

5. The tool according to claim 1 in which the recess forming said rear jaw being formed on the distal end of said arm and being in the form of a substantially U-shaped cross-sectional pocket facing said front jaw, said pocket having a base formed by the inner side of said arm and a pair of substantially spaced and slightly divergent side flanges extending from said arm one upon each side thereof, said side flanges of said rear jaw engaging one upon each side of said lever when engaged thereon.

6. The tool according to claim 2 in which the recess forming said rear jaw being formed on the distal end of said arm and being in the form of a substantially U-shaped cross-sectional pocket facing said front jaw, said pocket having a base formed by the inner side of said arm and a pair of substantially spaced and slightly divergent side flanges extending from said arm one upon each side thereof, said side flanges of said rear jaw engaging one upon each side of said lever when engaged thereon but on the opposite side of said lever to said front jaw.

7. The tool according to claim 5 in which said cam includes a clearance adjusting nut thereon, a wrench socket formed on the other end of said handle operatively engageable with said nut to rotate same and hence adjust the clearance of said cam.

8. The tool according to claim 6 in which said cam includes a clearance adjusting nut thereon, a wrench socket formed on the other end of said handle operatively engageable with said nut to rotate same and hence adjust the clearance of said cam.

9. A clearance testing and adjusting tool for air brake cams which includes an actuating lever having a front side and a rear side; said tool comprising an elongated handle and a front and rear jaw extending from one end thereof, said jaws lying on the sane plane and each including a transverse axis, said front jaw having a recess on the inner surface thereof to engage over the front side of the actuating lever, said rear jaw also having a recess engaging over the far side of the actuating lever whereby said lever may be rocked in an arc to test the clearances existing in said air brake cam, the transverse axis of one of said jaws being located above the transverse axis of the other of said jaws, said rear jaw including an arm offset from said handle on the side of said lever opposite to said front jaw and curving upwardly to lie substantially spaced and parallel to said handle, said rear jaw being formed on the distal end of said arm and being in the form of a substantially U-shaped cross-sectional pocket facing said front jaw but being situated spaced transversely therefrom and below said front jaw, said pocket having a base formed by the inner side of said arm and a pair of substantially spaced and slightly divergent side flanges extending from said arm one upon each side thereof, said side flanges of said rear jaw engaging one upon each side of said lever when engaged therefrom.

10. The tool according to claim 9 in which said cam includes a clearance adjusting nut thereon, a wrench socket formed on the other end of said handle operatively engageable with said nut to rotate same and hence adjust the clearance of said cam.

11. The tool according to claim 9 in which said front jaw is longer than said rear jaw, thereby locating same in a plane above said rear jaw.

12. The tool according to claim 11 in which said cam includes a clearance adjusting nut thereon, a wrench socket formed on the other end of said handle operatively engageable with said nut to rotate same and hence adjust the clearance of said cam.

* * * * *